United States Patent Office 2,848,333
Patented Aug. 19, 1958

2,848,333

METHOD OF PROCESSING FRESH FRUIT

George A. Fisher, Selinsgrove, Pa.

No Drawing. Application March 19, 1954
Serial No. 417,496

3 Claims. (Cl. 99—102)

The present invention relates to the processing of fresh fruit, and is primarily concerned with improved procedures for impregnating fruits, particularly soft-bodied fruits, with sugar in the preparation of candied or glaced fruits. The invention has been developed directly in connection with the production of maraschino cherries, and it will be described in that connection.

Heretofore it has been the universal practice, in the commercial production of maraschino cherries, to soak the fruit in a brine containing sulphur dioxide and lime or other calcium salts, for an extended period, before subjecting the fruit to any other treatment; and it has been conventional to use a sulphur dioxide concentration of fifteen thousand or more parts per million, whereby an impregnation of the fruit with sulphur dioxide to a degree substantially beyond that permissible in the final product, under applicable Pure Food Laws, has been attained. The purpose of such excessive impregnation has been to remove the natural color of the fruit and to preserve the fruit during the subsequent steps in the preparation of the desired end product; but of course such excessive permeation by sulphur dioxide has made it necessary to subject the fruit, sometime before final packaging, to a treatment for removal of the excess sulphur dioxide.

A major object of the invention is to provide an improved process for the preparation of maraschino cherries and comparable products, of such character as to preserve, in the finished product, substantially all of the natural juices, solids, flavors, coloring matter and the like, thus obviating the necessity for adding or restoring substances which have inevitably been removed from the fruit in the practice of previously-known processes for preparing such products.

A further object of the present invention is to devise a procedure under which only permissible proportions of sulphur dioxide are introduced into the fruit, whereby the step of removal of sulphur dioxide is obviated.

A further object of the invention is to reduce the time required heretofore in the preparation of products of the character here under consideration, by manipulation which renders it possible, without damage to the fruit, to permeate the fruit immediately with a high-concentration sugar syrup, instead of following conventional practice under which it has always been necessary to treat the fruit successively with sugar syrups of gradually increasing concentrations. While I have accomplished this general result through the process disclosed in my copending application Serial No. 265,723, filed January 9, 1952, for "Method of Processing Maraschino Cherries," the present disclosure comprises an alternative and, in some respects, an improved procedure for accomplishing such general result.

A further object of the invention is to provide a process in which desirable "firming" of the fruit is accomplished, at least in part, by the step of soaking the permeated fruit, together with a mass of the crushed pits of the same fruit, in a sugar syrup, preferably for an extended period.

A further object of the present invention is to force the calcium salt into the fruit more quickly than has been possible under previously-known processes. I presently believe that the calcium salt, when thus quickly introduced into the body of the fruit, reacts with the natural pectic substances in the fruit to "firm" the fruit and to inhibit deterioration of the texture and flavor of the fruit during subsequent handling and treatment.

Still further objects of the invention will appear as the description proceeds.

To the accomplishment of the above and related objects, my invention may be embodied in the steps described in the following specification, attention being called to the fact, however, that the specific procedure described is by way of illustration only and that changes may be made therein, so long as the scope of the appended claims is not violated.

According to the present invention, I place a suitable mass of fresh, previously-untreated cherries in a suitable chamber, then close the chamber and evacuate the chamber to a selected degree of subatmospheric pressure. Care must be taken to avoid crushing which may result from the unsupported weight of a relatively deep mass of cherries. Preferably, the cherry mass will be liquid-supported within the chamber; for instance, by a sugar-syrup of such concentration as will, after final treatment, produce the desired percentage of sugar-solids in the fruit. Or, in some instances, it may be desirable to support the fruit initially in a syrup having a sugar concentration substantially equivalent to that of the untreated fruit. Alternatively, if a wide, shallow chamber is used, so that the cherries may lie in a mass only two or three inches deep, they may be treated without such an initial liquid support.

Preferably, the cherries used will be tree-ripened; and, if desired, they may be pitted before introduction into the treating chamber. The degree of vacuum selected will vary with the characteristics of the fruit being treated, and a higher degree of vacuum can be used if the cherries have been pitted. I presently believe that the desirable range of pressure to be used will be between that represented by a 15-inch column of mercury and that represented by a 29½-inch column of mercury. If unpitted cherries are used, a degree of vacuum represented by a 20 to 25 inch column will be optimum; and if pitted cherries are used, a degree of vacuum represented by a 25 to 29½ inch column will be optimum. The above figures apply, specifically, to Montmorency cherries. The types known as "sweets," and some other fruits, can be subjected to the higher ranges of vacuum, without damage, even if not previously pitted.

The fruit is now held in the closed chamber under the selected degree of vacuum for a period which will vary with the degree of vacuum used. If a 15-inch vacuum is used, the fruit should be held for a period of thirty minutes or longer; and that time can be reduced to approximately eight minutes if a 29½-inch column is used. About ten minutes is the proper holding time when using a 25-inch vacuum.

At the end of the selected holding time, the fruit is quickly flooded with an aqueous solution which has a sugar concentration sufficiently high to produce, upon permeation of the fruit thereby, the desired sugar-solids content for the finished product, and which carries, also, any other substances which it may be desired to introduce into the finished product. If the initial supporting liquid has been a high-concentrate syrup, it may be that, at this point, it will only be necessary to inject flavoring, coloring or conditioning substances into the chamber. If, however, a low-concentrate syrup has been used to buoy the fruit, or if the fruit has been vacuumized in the absence of a supporting liquid, a high-concentrate syrup will be pumped into the chamber at this point. Evacuation of the chamber will be continued, however, so that the selected degree of vacuum will be substantially maintained in spite of the introduction of such syrup and/or other substances to the chamber.

The said aqueous solution is primarily a sugar syrup having a concentration within the range from 54% to 85% of sugar solids, by weight. The degree of sugar concentration will preferably depend, at least to some extent, upon the character and degree of ripeness of the fruit being treated.

The objective is to bring the percentage of sugar solids in the fruit to approximately 30% to 75% of the weight of the fruit; and of course it is to be understood that the untreated fruit contains varying percentages of sugar solids, depending upon the character and the ripeness of the fruit.

The flooding solution will also contain a soluble calcium salt such as, for instance, calcium chloride, calcium carbonate or other non-toxic soluble calcium salts in a concentration sufficient to combine with the pectin present in the fruit and usually within the range between 0.026% and 0.05%.

During this period, sulphur dioxide is brought into contact with the fruit, either by injection of $SO_2$ gas into the chamber or by previously dissolving sulphur dioxide in the flooding solution. In either case, the amount of sulphur dioxide used will be sufficient to permeate the fruit only to an extent permissible under the Pure Food and Drug Laws, and usually within the range between six hundred parts and one thousand parts per million parts of solution.

If desired, the flooding solution may also carry, in solution or suspension, coloring and/or flavoring ingredients and/or sodium benzoate or other suitable preservatives.

The flooding solution will be supplied to the chamber in sufficient quantity to submerge all of the fruit under treatment; and preferably means will be provided for holding the fruit below the surface of the flooding solution. This is for the reason that the fruit should be protected against permeation by air when the vacuum is broken. Alternatively, the vacuum may be broken by the injection into the chamber of an inert gas such as, for instance, nitrogen.

Promptly after the flooding step has been completed, the vacuum will be broken; but the pressure within the chamber should be raised gradually to atmospheric value over a period of, for instance, about ten minutes.

In most instances, it is desirable to allow the fruit to stand in the flooding liquid for a period, such as, for instance, seventy-two hours, preferably with periodic agitation; and in many instances it may be desirable to pasteurize the fruit before packing. Pasteurization can be effectively accomplished by raising the temperature of the fruit and the flooding liquid to approximately 165°–200° F., holding it at the selected temperature for a suitable period varying inversely with the selected temperature, in accordance with known pasteurization requirements, and then cooling it artificially to approximately 120° F., before draining. An optimum procedure for accomplishing pasteurization is to pass the fruit and flooding liquid through a continuous, tubular heat exchanger, the first section of which is designed to accomplish the indicated elevation and maintenance of temperature, and the second section of which is proportioned and designed to cool the mass quickly to approximately 120° F.

I have found that a rather startling improvement in instance, maraschino cherries is attained if a suitable the color, flavor, texture and keeping qualities of, for mass of crushed, fresh cherry pits is allowed to stand with the impregnated cherries in a sugar syrup for an extended period. While this treatment may be carried out during the soaking period above recommended, the optimum procedure to this end, I presently believe, is to store the impregnated cherries, whether pitted or unpitted, in a suitable receptacle and immersed in a sugar syrup, along with a mass of crushed cherry pits, likewise immersed in the syrup; and I presently believe that, for optimum results, a mass of crushed cherry pits within the range of 10% to 20% of the mass of cherries, should be used. Preferably, the cherry pits will be retained in a bag, or the like, made of material permeable by the syrup. If the cherries are pitted before such storage, the pits removed from the selected mass of cherries may desirably be used in this treatment.

I cannot certainly explain the preservative effect of the treatment with pits or the improvement of flavor which results therefrom; but I suspect that these results are produced by the action of anti-oxydants which are naturally present in the pits and which are, perhaps, esters of gallic acid. It may be possible to extract the active factors in some form from the fresh cherry pits and to use such extract directly in the process, rather than to use the bulk of the crushed pits in the manner above described.

I claim as my invention:

1. The method of impregnating fresh pitted cherries which comprises maintaining a mass of said fruit in an enclosed zone, partially evacuating said zone, flooding the fruit in said zone, while maintaining said evacuated condition, with an aqueous solution of sugar, calcium salt and sulfur dioxide to impregnate the fruit therewith, the sulfur dioxide being in a concentration not exceeding one part per thousand of the flooding solution, and thereafter gradually increasing the pressure in said zone to atmospheric condition.

2. The method of claim 1 wherein the cherries, while immersed in sugar syrup, are stored in a receptacle containing also a mass of crushed fresh cherry pits.

3. In the method of producing maraschino cherries wherein fresh pitted cherries are impregnated with and stored in an aqueous liquid containing added sugar, calcium salt and sulphur dioxide in a concentration not exceeding one part per thousand of said liquid, the step which comprises immersing in said liquid crushed fresh cherry pits confined in a receptacle permeable to said liquid.

References Cited in the file of this patent

UNITED STATES PATENTS

| | | |
|---|---|---|
| 1,631,017 | Crawford | May 31, 1927 |
| 1,890,475 | Todd | Dec. 13, 1932 |
| 1,906,295 | Wickenden | May 2, 1933 |
| 2,692,831 | Weckel et al. | Oct. 26, 1954 |
| 2,702,248 | Guadagni | Feb. 15, 1955 |